United States Patent [19]

Ortolano et al.

[11] Patent Number: 5,521,584
[45] Date of Patent: May 28, 1996

[54] APPARATUS AND METHOD FOR DETECTING ICE

[75] Inventors: Dominic Ortolano, Bethel; George Petruney, Newtown, both of Conn.; Fredric C. Amt, State College, Pa.

[73] Assignee: Eaton Corporation, Cleveland, Ohio

[21] Appl. No.: 136,568

[22] Filed: Oct. 13, 1993

[51] Int. Cl.⁶ .................................................. G08B 19/02
[52] U.S. Cl. .................. 340/581; 73/170.26; 244/134 F; 340/962
[58] Field of Search .................... 340/581, 580, 340/585, 588–589, 962; 73/170.26; 244/134 F; 374/107

[56] References Cited

U.S. PATENT DOCUMENTS

| | | | |
|---|---|---|---|
| 3,305,851 | 2/1967 | Brandtszteter | 340/581 |
| 4,766,369 | 8/1988 | Weinstein | 340/580 X |
| 4,819,480 | 4/1989 | Sabin | 340/581 X |
| 4,882,574 | 11/1989 | Khurgin | 340/581 |
| 5,003,295 | 3/1991 | Kleven | 340/581 |

Primary Examiner—Thomas Mullen
Attorney, Agent, or Firm—Tarolli, Sundheim & Covell

[57] ABSTRACT

An apparatus for detecting ice includes a heat flow sensor which senses the rate of flow of heat through a member. At the same time, the temperature differential across the member is determined. Based on the temperature differential, it is possible to calculate a theoretical heat flow rate based on the assumption that there is no ice on the member. If ice is present on the surface of the member, the actual heat flow rate will be significantly less than the calculated or theoretical heat flow rate. It is contemplated that the apparatus and method of this invention will be particularly useful in conjunction with the detecting of the presence of ice on a wing of an aircraft.

13 Claims, 3 Drawing Sheets

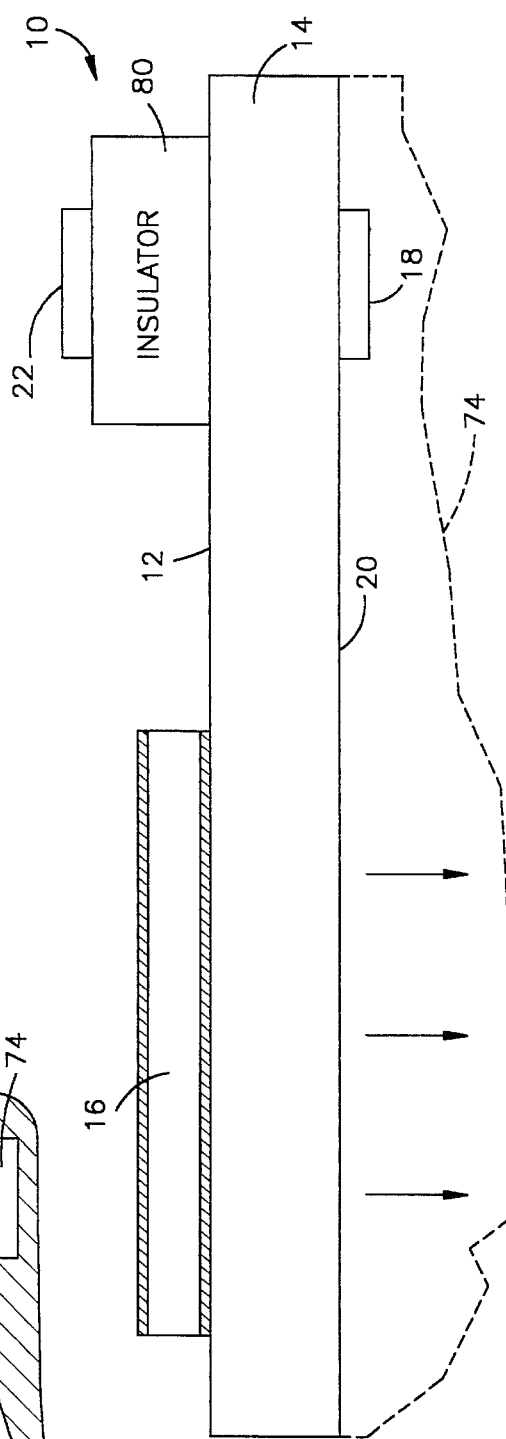
Fig.1A
Fig.1
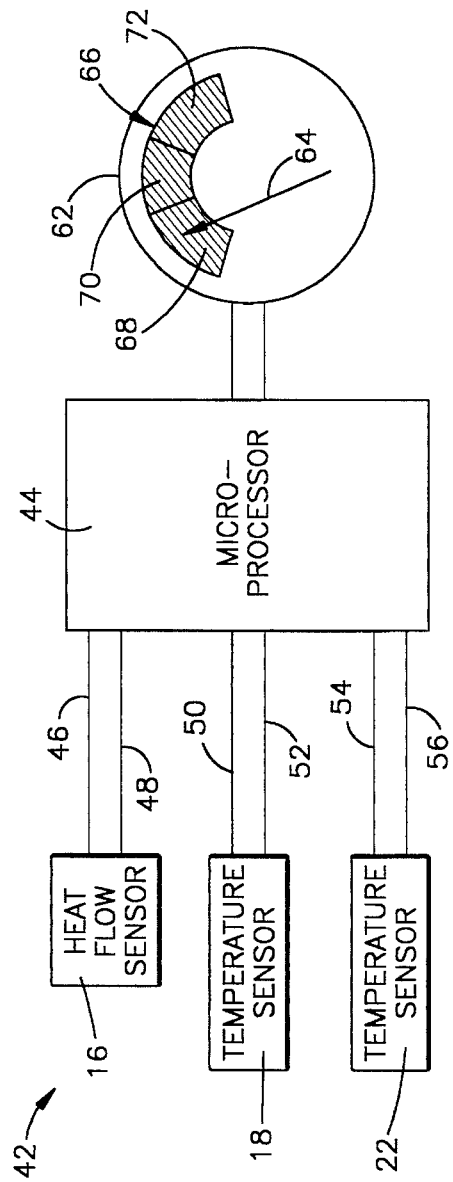
Fig.2

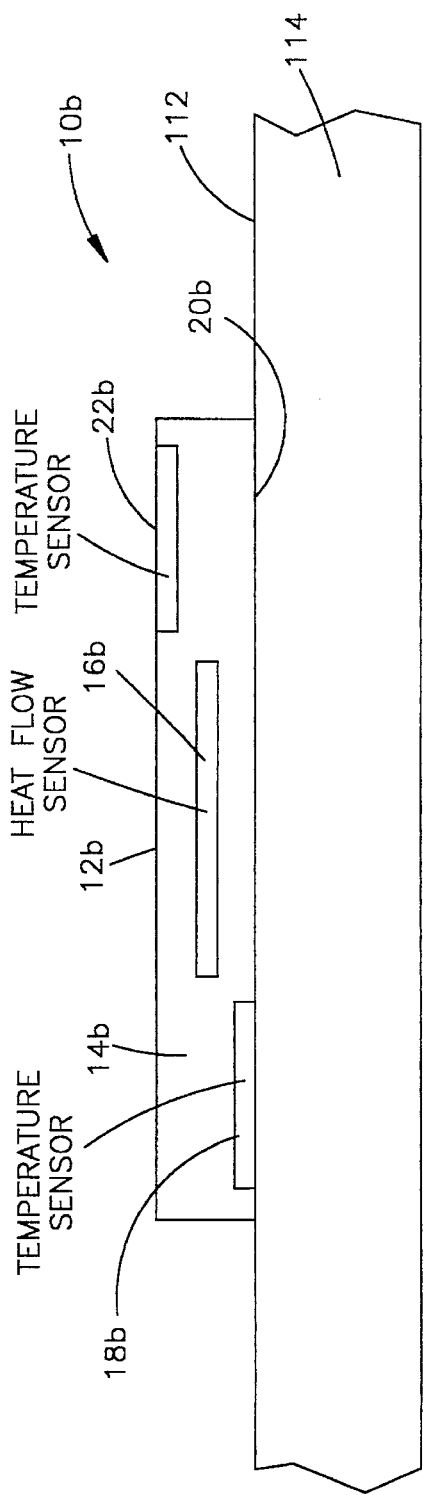
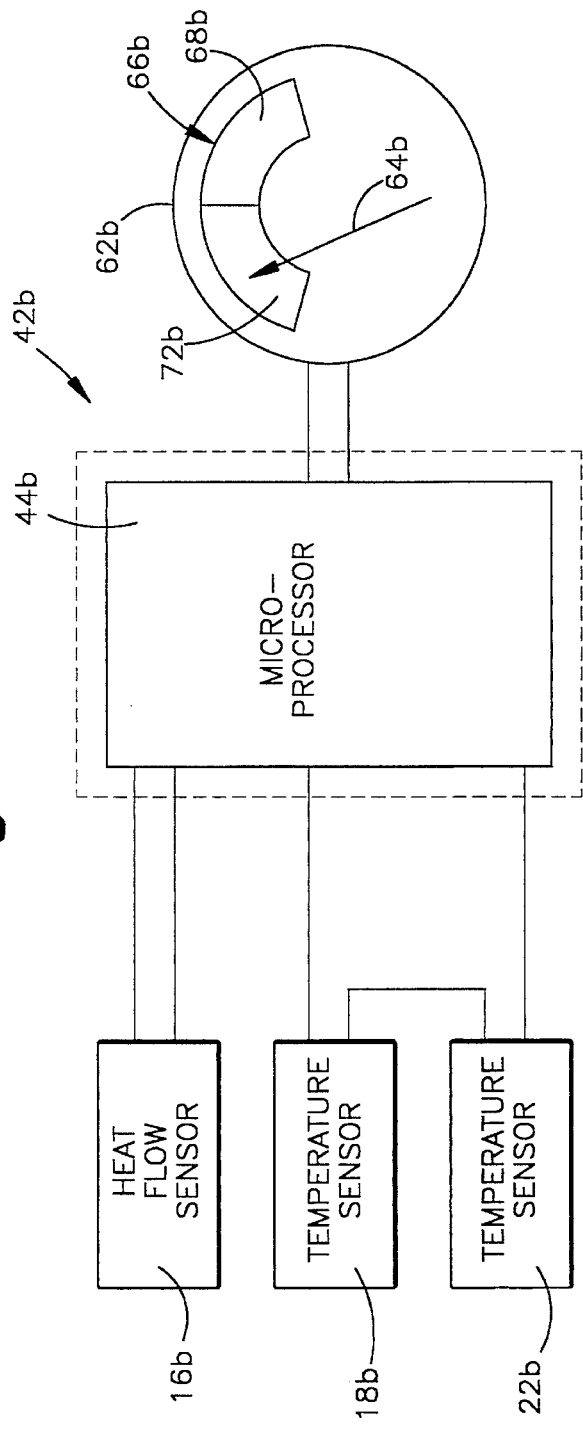

APPARATUS AND METHOD FOR DETECTING ICE

BACKGROUND OF THE INVENTION

The present invention relates to a new and improved apparatus and method for detecting the presence of ice on a surface of a member and, more specifically, to an apparatus for detecting the presence of ice on a surface of an aircraft wing.

It is a common practice to have a physical inspection of the wings of aircraft at a terminal to determine if ice has formed on the wing. Conducting a physical inspection for ice on aircraft wings at the terminal is time consuming and expensive. Therefore, it has previously been suggested that an ice detection system be provided in association with the wing of an aircraft. An ice detection system should be relatively low in cost and easily installed.

A system for detecting ice on a wing of an aircraft must provide a fault-free, false-alarm-free indication of the presence of ice. The reliability of the detection system must be sufficient to enable physical inspections to be eliminated. Therefore, a system which reliably detects the presence of ice on the wing of an aircraft would be desirable.

An apparatus for detecting the presence of ice on the wing of an aircraft is disclosed in U.S. Pat. No. 4,819,480. The apparatus disclosed in this patent utilizes a heat flux transducer to measure heat flow. When ice is present, the thermal impedance of the ice causes a smaller amount of heat to flow through the transducer. The reduced rate of heat flow through the transducer indicates the formation of ice on a portion of the aircraft.

Another ice detection system is disclosed in U.S. Pat. No. 3,305,851. The ice detection system disclosed in this patent uses a thermo-electric element to detect the formation of ice on a wing of an aircraft. The rate at which power is supplied to the thermo-electric element is varied as a function of the temperature of a cold surface on the thermo-electric element and a surface on the leading edge of a wing. Other ice detection systems are disclosed in U.S. Pat. Nos. 4,766,369 and 4,882,574.

SUMMARY OF THE INVENTION

An improved apparatus and method in accordance with the present invention can be used to detect the presence of ice on the surface of a member, such as an aircraft wing. Although it is contemplated that the apparatus will be particularly useful in detecting the presence of ice on the wing and/or other portions of the aircraft, the apparatus and method may be used to detect the presence of ice on many different types of members, such as a road surface.

To detect the presence of ice on the surface of a member, the rate of heat flow through a portion of the member is sensed. The temperatures adjacent to opposite sides of the member are determined. A theoretical rate of heat flow through a portion of the member is calculated as a function of the temperature adjacent to opposite sides of the member. This calculation of the theoretical heat flow rate assumes that the surface of the member is free of ice. By comparing the calculated rate of heat flow with the sensed or actual rate of heat flow, a determination can be made as to whether or not ice is present on the surface of the member.

When the apparatus and method of the present invention are utilized to detect the presence of ice on the wing of an aircraft, the temperature of at least a portion of the fuel in a tank in a wing of the aircraft may be sensed or the temperature adjacent to a surface of the wing may be sensed. In addition, the temperature of the air around the outside of the wing is sensed. From these two temperatures, a theoretical heat flow rate can be calculated based on the assumption that the wing of the aircraft is free of ice. By sensing the actual flow rate of heat and comparing this actual heat flow rate to the theoretical or calculated heat flow rate, a determination can be made as to whether or not ice is present on the surface of the wing.

In another embodiment of the invention, the rates of flow of heat through upper and lower surfaces of a wing of an aircraft are sensed. The two heat flow rates are compared to determine if ice is present on the wing.

BRIEF DESCRIPTION OF THE DRAWINGS

The foregoing and other features of the invention will become more apparent upon a consideration of the following description taken in connection with the accompanying drawings wherein:

FIG. 1 is a schematic illustration depicting an apparatus for use in detecting the presence of ice on the surface of a member;

FIG. 1A is a schematic illustration of an aircraft wing and fuel tank with which the apparatus of FIG. 1 may be used;

FIG. 2 is a schematic illustration of a control apparatus for comparing a calculated rate of heat flow to a heat flow rate sensed by the apparatus of FIG. 1 to determine if ice is present on the surface of the member;

FIG. 5 is a schematic illustration of an embodiment of the invention in which a heat flow sensor and a pair of temperature sensors are mounted on a member which is secured to a wing of an aircraft; and FIG. 6 is a schematic illustration of a control apparatus for comparing a calculated rate of heat flow to a heat flow rate sensed by the apparatus of FIG. 5 to determine if ice is present on the surface of the member.

DESCRIPTION OF SPECIFIC PREFERRED EMBODIMENTS OF THE INVENTION

Figure 3:
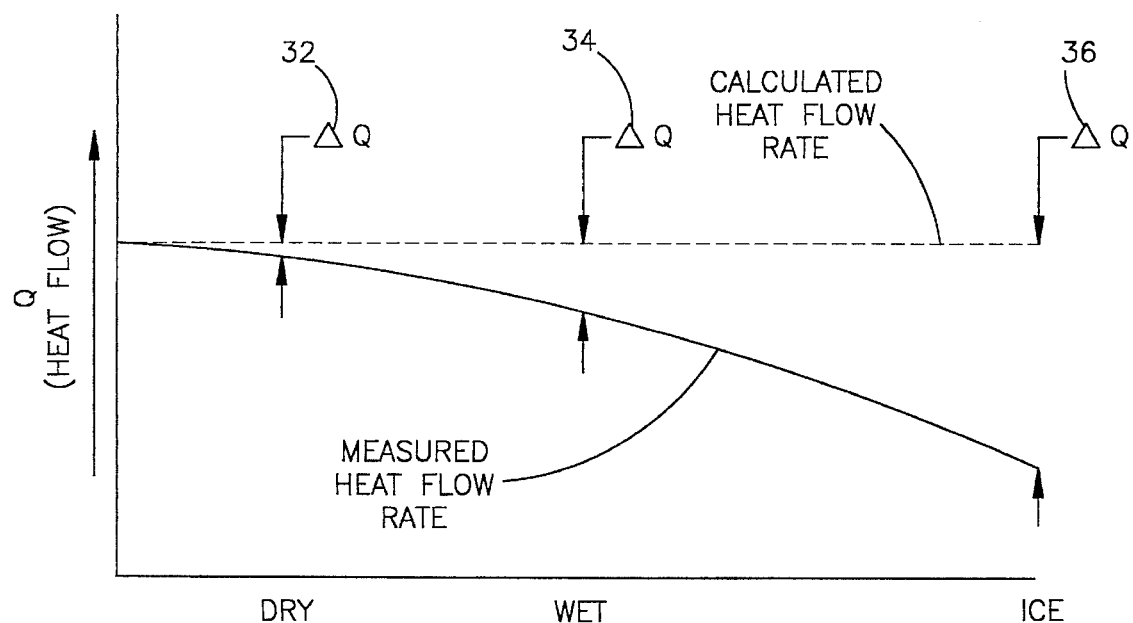
FIG. 3 is a graph depicting the general manner in which the rate of heat flow varies with variations in the surface condition of a member.

When an aircraft is flown at relatively high altitudes for a substantial period of time, fuel in tanks within the wings of the aircraft become very cold. When the aircraft lands, the wings are exposed to ambient air which is substantially warmer than the fuel within the aircraft wings. This may cause water to condense and ice to form on the outside of the aircraft wings. Although the present invention is advantageously used to detect the formation of ice on a wing of an aircraft, the invention can be used to detect the formation of ice on many other members.

An apparatus 10 for detecting the presence of ice on a relatively warm upper side surface 12 of a member 14 is disclosed in FIG. 1. The apparatus includes a heat flow sensor 16. A temperature sensor or thermocouple 18 detects the temperature adjacent to a relatively cold lower side surface 20 of the member 14. A second temperature sensor or thermocouple 22 detects the temperature of the air adjacent to a relatively warmer upper side surface 12 of the member 14. The direction of heat flow through the member 14 is indicated by the arrows in FIG. 1. If desired, the apparatus 10 could be used to detect ice in a situation in which the heat flows in the opposite direction.

Although the apparatus 10 may be used with many different types of structures, the apparatus may be used with a wing 15 (FIG. 1A) of an aircraft. A fuel tank 74 in the wing of the aircraft is illustrated in FIG. 1A. When the member 14 is a portion of a wing 15 of an aircraft, the apparatus 10 will detect ice on the wing of the aircraft.

Based on the temperature differential sensed by the thermocouples 18 and 22, a theoretical rate of heat flow through the member 14 for the conditions to which the member is exposed can be calculated. The calculated rate of flow of heat through the member 14 will vary as a direct function of temperature differential between opposite side surfaces 12 and 20 of the member. Thus, the rate of heat flow can be computed by the following equation:

$$q = \frac{k \times A \times (t_{18} - t_{22})}{L}$$

In the foregoing equation, q represents the calculated rate of heat flow. The thermal conductivity of the material of the member 14 is represented by k. The area for which heat flow is calculated is represented by A. The thickness of the member 14, that is the distance between the opposite side surfaces 12 and 20, is represented by L. The temperature sensed by the thermocouple 18 is represented by $t_{18}$ and the temperature sensed by the thermocouple 22 is represented by $t_{22}$.

The foregoing equation for calculating the theoretical rate of heat flow between opposite side surfaces 12 and 20 of the member 14 assumes that the surface 12 of the member is free of ice. If ice accumulates on the surface 12 of the member, the presence of ice effects the rate of heat transfer. Thus, if the member 14 is formed of aluminum, it will have a thermal conductivity (k) of approximately 130 BTU/(hr. ft$^2$, °F. ft). The thermal conductivity of ice is approximately 1.26 BTU/ (hr. ft$^2$, °F. ft). Thus, the thermal conductivity of aluminum is substantially greater than the thermal conductivity of ice. Therefore, a build up of ice on the surface 12 of the member 14 will impede the transfer of heat from the relatively warm air above (as viewed in FIG. 1) the member 14 through the ice and surface 12 to the relatively cold surface 20.

The changes in the heat flow rate through a member 14 with changing conditions on the surface 12 of the member is illustrated schematically by the graph in FIG. 3. Thus, in FIG. 3, the horizontal dashed line represents the calculated heat flow rate assuming that the surface 12 of the member 14 is dry and free of ice or moisture. The calculated heat flow rate also assumes that the temperature of the air adjacent to the surface remains constant at a temperature.

The difference between the measured heat flow rate and the calculated heat flow rate when the surface 12 is dry and free of ice is indicated at 32 in FIG. 3. The difference between the calculated heat flow rate and measured heat flow rate when the surface 12 has been wetted with water is indicated at 34 in FIG. 3. Finally, the difference between the calculated heat flow rate and the measured heat flow rate when approximately 1/16 of an inch of ice is present on the surface 12 is indicated at 36 in FIG. 3.

By comparing the calculated heat flow rate to the measured heat flow rate, it can be determined whether or not ice is present on the surface 12 of the member 14. Thus, if the surface 12 is dry, there will be a relatively small difference between the calculated heat flow rate and the heat flow rate measured by the heat flow sensor 16. This relatively small difference in heat flow rates has been indicated at 32 in FIG. 3.

If the surface 12 is wet with water, the heat flow rate measured by the sensor 16 will be less than the calculated heat flow rate by the amount indicated at 34 in FIG. 3. As soon as ice begins to build up on the surface 12, the ice impedes the flow of heat from the surface 20 to the surface 12 of the member 14. Thus, when ice has formed on the surface 12, the difference between the heat flow rate measured by the sensor 16 and the calculated heat flow rate is indicated by the relatively large quantity designated 36 in FIG. 3.

By comparing the calculated rate of heat flow for the temperature differential sensed by the thermocouples 18 and 22 and the rate of heat flow measured by the sensor 16, it can be determined whether or not ice has accumulated on the surface 12. A control apparatus 42 (FIG. 2) is provided to calculate the theoretical heat flow rate from the temperature sensed by the thermocouples 18 and 22 and to compare this calculated heat flow rate with the heat flow rate measured by the sensor 16. It is contemplated that the apparatus 10 and the control apparatus 42 will be used to detect the formation of ice on the wing of an aircraft when the flow of heat is in the opposite direction, that is, from the surface 20 to the surface 12.

The control apparatus 42 includes a microprocessor 44 which receives a signal over leads 46 and 48 indicative of the heat flow rate measured by the sensor 16. The microprocessor 44 receives a signal over leads 50 and 52 indicative of the temperature sensed by the thermocouple 18. In addition, the microprocessor 44 receives a signal over leads 54 and 56 indicative of the temperature sensed by the thermocouple 22. An algorithm in the microprocessor 44 calculates the theoretical rate of heat flow based on the equation previously set forth herein. The microprocessor 44 then compares the calculated rate of heat flow with the heat flow rate measured by the sensor 16. An indicator 62 provides an output indicative of the difference between the calculated heat flow rate and the actual heat flow rate measured by the sensor 16.

In the illustrated embodiment of the invention, the indicator 62 has a needle 64 which cooperates with a scale 66. If there is a relatively small difference between the calculated heat flow rate and the measured heat flow rate, that is the quantity indicated at 32 in FIG. 3, the needle 64 (FIG. 2) cooperates with a portion of the scale 66 indicated at 68. However, if the surface 12 is wet so that the difference between the calculated heat flow rate and the measured heat flow rate is increased, the needle 64 will cooperate with the portion of the scale 66 indicated at 70 in FIG. 2. Finally, if ice is present on the surface 12 and there is a relatively large difference between the calculated heat flow rate and the heat flow rate measured by the sensor 16, as indicated at 36 in FIG. 3, the indicator needle 64 (FIG. 2) will cooperate with the portion 72 of the scale 66.

Although an analog type indicator 62 has been illustrated in FIG. 2, it is contemplated that a digital indicator could be used. It is also contemplated that a visual and/or aural indication could be given when there is a relatively large difference between the calculated heat flow rate and the measured heat flow rate, that is, when the needle 64 cooperates with the portion 72 of the scale 66. This would provide an added alarm to attract the attention of personnel using the control apparatus 42.

It is contemplated that the apparatus 10 for detecting the presence of ice will be used in association with many different types of members in many different types of environments. However, it is believed that the apparatus 10 will be particularly useful when used in association with an aircraft and/or for pavement surface ice detection. When the apparatus 10 is to be used in association with an aircraft, the lower or inner thermocouple 18 is advantageously positioned in a fuel tank 74 inside of a wing of the aircraft. The large volume of fuel in the tank provides a thermally stable medium in which the temperature on the inside of the wing can be sensed by the thermocouple 18. Although the temperature inside the wing may more frequently be lower than the temperature outside of the wing, the apparatus 10 can be used to detect ice when the temperature inside the wing is either higher or lower than the temperature outside of the wing.

The temperature sensor or thermocouple 22 is thermally insulated from the wing by a body 80 of polymeric foam or similar thermally insulating material. Therefore, the thermocouple 22 senses the temperature of the air in the environment around the upper or outer side surface 12. In this specific installation, the member 14 would be the structure which is between the inside of the fuel tank and the outer side surface 12 of the wing.

The heat flow sensor 16 is advantageously secured to the side surface 12 of the wing with a suitable aircraft structural adhesive and/or mechanical connections. The thermocouples 18 and 20 may be mounted adjacent to the inner and outer side surfaces 20 and 12 of the wing 14 in any desired manner. Although many different types of thermocouples could be utilized, it is presently preferred that the thermocouples 18 and 20 be thermocouples which are commercially available from Eaton Corporation, Pressure Sensors Division, Bethel, Conn. under the designation 42 TC 10 Thermocouple, type K.

The heat flow sensor 16 may have any desired construction. One suitable heat flow sensor 16 was invented by Eaton Corporation, Pressure Sensors Division, Bethel, Conn. This specific heat flow sensor 16 has thin layers of copper and constantan sputtered onto a polyimide (Kapton-trademark) substrate. The thin layers of copper and constantan overlap each other. A pattern is etched into the metallic layers to form a series of alternating polarity thermocouple junctions. A thermal barrier is then laminated over the thermocouple junctions. Copper leads are attached and thin protective layers of polyimide are laminated over the structure. Another suitable heat flow sensor 16 is commercially available from RDF Corporation of Hudson, N.H., U.S.A. under the designation of Micro-Foil Heat Flow Sensor (trademark).

Figure 4:
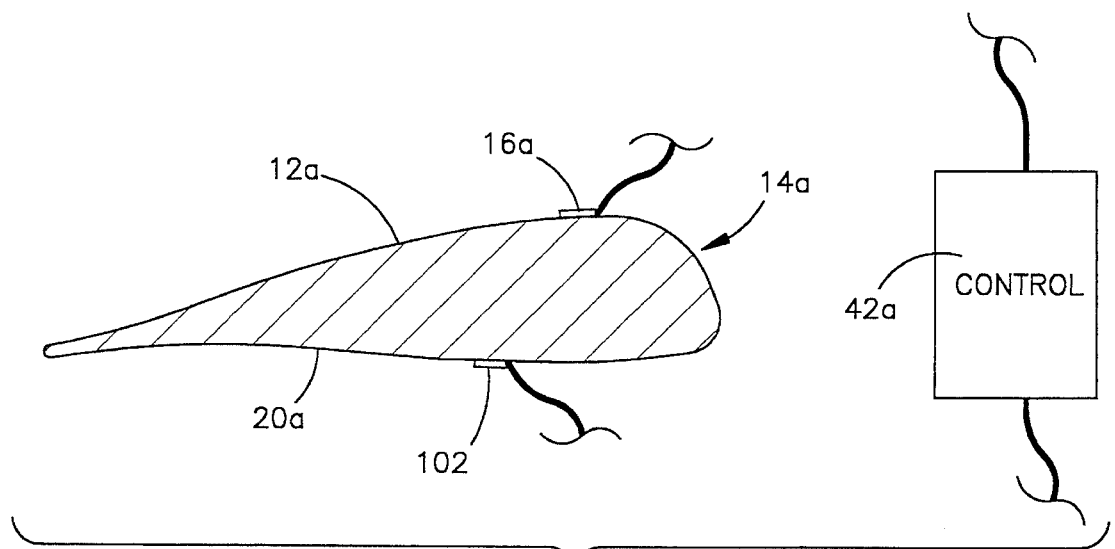
FIG. 4 is a schematic illustration of an embodiment of the invention in which a pair of heat flow sensors are used to sense the actual heat flow rate from opposite sides of a wing of an aircraft.

In the embodiment of the invention illustrated in FIGS. 1–3, the actual or measured rate of heat flow is compared to a theoretical or calculated rate of heat flow to determine whether or not ice is present on a surface. In the embodiment of the invention illustrated in FIG. 4, the heat flow rates measured by a pair of sensors are compared to determine whether or not ice is present on a surface of a member. Since the embodiment of the invention illustrated in FIG. 4 is generally similar to the embodiment of the invention illustrated in FIGS. 1–3, similar numerals will be utilized to designate similar components, the suffix letter "a" being associated with the numerals of FIG. 4.

An aircraft wing 14a has an upper side surface 12a and a lower side surface 20a. A heat flow sensor 16a is provided to measure the rate of heat flow through the upper side surface 12a of the aircraft wing 14a. A heat flow sensor 102 is utilized to measure the rate of flow of heat through the lower side surface 20a of the aircraft wing 14a. A control apparatus 42a is connected with the heat flow sensors 16a and 102.

The control apparatus 42a compares the heat flow rate measured by the sensors 16a and 102. If ice is present on one of the surfaces 12a or 20a while the other surface is free of ice, there will be a relatively large difference in the heat flow rates measured by the sensors 16a and 102.

During normal operation of an aircraft, for example when the aircraft is waiting to depart from a terminal, ice will form on the upper side surface 12a of the wing 14a before the ice forms on the lower side surface 20a of the wing. Therefore, as ice begins to form on the upper side surface 12a of the wing 14a, the rate of flow of heat measured by the heat flow sensor 16a will be substantially less than the rate of flow of heat measured by the heat flow sensor 102. The control apparatus 42a detects the difference in the heat flow rates measured by the sensors 16a and 102 and activates visual and/or aural alarms to alert a pilot when the difference in heat flow rates indicates that ice has formed on the upper side surface 12a of the aircraft wing.

In the embodiment of the invention illustrated in FIGS. 1–3, the member 14 is a portion with a structure upon which the formation of ice is to be detected. Thus, in the embodiment of the invention illustrated in FIGS. 1–3, the member 14 may be a portion of the wing of an aircraft. However, it is contemplated that the member 14 could be formed separately from the structure upon which ice is to be detected and subsequently mounted on the structure. Thus, in the embodiment of the invention illustrated in FIGS. 5 and 6, a member formed separately from the wing of the aircraft and is mounted on the wing of the aircraft. Of course, the member could be mounted on structures other than aircraft, for example, in association with a road or bridge. Since the embodiment of the invention illustrated in FIGS. 5 and 6 is generally similar to the embodiment of the invention illustrated in FIGS. 1–3, similar numerals will be utilized to designate similar components, the suffix letter "b" being associated with the numerals of FIGS. 5 and 6 in order to avoid confusion.

An apparatus 10b for detecting the presence of ice on an upper side surface 112 of an aircraft wing 114 is disclosed in FIG. 5. The following description will assume that the temperature inside the wing 14 is substantially less than the temperature outside the wing. The apparatus 10b includes a member 14b which is mounted on the aircraft wing 114 with a suitable aircraft structural adhesive and/or mechanical connections. The member 14b has a relatively warm upper side surface 12b which is exposed to the air around the aircraft wing 114.

A heat flow sensor 16b is mounted in a central portion of the member 14b. A temperature sensor or thermocouple 18b detects the temperature adjacent to a relatively cold lower side surface 20b of the member 14b. The surface 20b of the member 14b is disposed adjacent to the relatively warm upper side surface 112 of the wing 114. Since the lower side surface 20b of the member 14b is protected from the air surrounding the wing 114, it is contemplated that the protected lower surface 20b of the member 14b will be at a lower temperature than the exposed outer side surface 12b of the member 14b.

A second temperature sensor or thermocouple 22b detects the temperature of the air adjacent to the relatively warm upper side surface 12b of the member 14b. Heat will flow through the member 14b to the protected lower side surface 20b from the exposed upper side surface 12b. Therefore, the temperature detected by the temperature sensor 18b will be slightly lower than the temperature sensed by the temperature sensor 22b.

Based on the temperature differential sensed by the temperature sensors 18b and 22b, a theoretical rate of heat flow through the member 14b for the conditions to which the member is exposed can be calculated. The calculated rate of heat flow through the member 14b will vary as a direct function of the temperature differential between opposite side surfaces 12b and 20b of the member in the manner previously explained in conjunction with the embodiment of the invention illustrated in FIGS. 1–3.

The calculated rate of heat flow through the member 14b assumes that the surface 12b of the member 14b is free of ice. If ice accumulates on the surface 12b of the member 14b, the presence of the ice will effect the rate of heat transfer. Although the member 14b could be made of many different materials, in one specific embodiment of the invention, the member 14b was formed of aluminum. The thermal conductivity of aluminum is substantially greater than the thermal conductivity of ice. Therefore, a build up of ice on the surface 12b of the member 14b will impede the transfer of heat to the relatively cold surface 20b of the member 14b through the surface 12b and the ice from the relatively warm air adjacent to the surface 12b.

By comparing the calculated heat flow rate to the measured heat flow rate, it can be determined whether or not ice is present on the surface 12b of the member 14b. Thus, if the surface 12b is dry, there will be a relatively small difference in the calculated heat flow rate and the heat flow rate measured by the heat flow sensor 16b. If the surface 12b is wet with water, the heat flow rate measured by the sensor 16b will be less than the calculated heat flow rate. As soon as ice begins to build up on the surface 12b, the ice impedes the flow of heat from the surface 20b to the surface 12b of the member 14b. Thus, when ice is formed on the surface 12b, the difference between the heat flow rate measured by the sensor 16b and the calculated heat flow rate will be relatively large.

Although the member 14b is formed separately from the aircraft wing 114, ice will begin to form on the upper side surface 12b of the member 14b at the same time that ice begins to form on the upper side surface 112 of the wing 114. This is because the upper side surface 112 of the wing 114 and the upper side surface 12b of the member 14b are exposed to the same conditions.

A control apparatus 42b is provided to calculate the theoretical heat flow rate of the temperature sensed by the thermocouples 18b and 22b and to compare this calculated heat flow rate with the heat flow rate measured by the sensor 16b. The control apparatus 42b includes a microprocessor 44b which receives a signal indicative of the heat flow rate measured by the heat flow sensor 16b. The microprocessor 44b also receives signals indicative of the temperatures sensed by the thermocouples 18b and 22b. An algorithm in the microprocessor 44b calculates the theoretical rate of heat flow based on the equation previously set forth herein in conjunction with the embodiment of the invention illustrated in FIGS. 1–3. The microprocessor 44b then compares the calculated rate of heat flow with the heat flow rate measured by the sensor 16b. An indicator 62b provides an output indicative of the difference between the calculated heat flow rate and the actual heat flow rate measured by the sensor 16b.

Although many different types of indicators could be utilized, the indicator 62b has a needle 64b which cooperates with a scale 66b. If there is a relatively small difference between the calculated heat flow rate and the measured heat flow rate, the needle 64b cooperates with a portion of the scale 66b indicated at 68b. However, if ice is present on the surface 12b and there is a relatively large difference between the calculated heat flow rate and the heat flow rate measured by the sensor 16b, the indicator needle 64b (FIG. 6) will cooperate with the portion 72b of the scale 66b.

Although the foregoing description has been in conjunction with a wing 114 of an aircraft, it is contemplated that the apparatus 10b for detecting the presence of ice will be used in association with many different types of members in many different types of environments. For example, it is believed that the apparatus 10b may be used to detect the formation of ice on the surface of a road, runway, or bridge.

In view of the foregoing description, it is apparent that an improved apparatus and method in accordance with the present invention can be used to detect the presence of ice on the surface of a member 14, which may be an aircraft wing. Although it is contemplated that the apparatus 10 will be particularly useful in detecting the presence of ice on the wing and/or other portions of the aircraft, it is contemplated that the apparatus and method may be used to detect the presence of ice on many different types of members 14, such as a road surface.

To detect the presence of ice on the side surface 12 of the member 14, the rate of heat flow through the member 14 is sensed. The temperatures adjacent to opposite side surfaces 12 and 20 of the member 14 are determined. A theoretical rate of heat flow through the member 14 is calculated as a function of the temperature adjacent to opposite side surfaces 12 and 20 of the member. This calculation of the theoretical heat flow rate assumes that the surface 12 of the member 14 is free of ice. By comparing the calculated rate of heat flow with the sensed or actual rate of heat flow, a determination can be made as to whether or not ice is present on the surface 12 of the member 14.

When the apparatus and method of the present invention are utilized to detect the presence of ice on the wing 14 of an aircraft, the temperature of the fuel in a tank in a wing of the aircraft may be sensed with the temperature sensor 18 or the temperature adjacent to a surface 112 (FIG. 5) of the wing may be sensed. In addition, the temperature of the air around the outside of the wing 14 is sensed with the temperature sensor 22. From these two temperatures, a theoretical heat flow rate can be calculated based on the assumption that the wing 14 of the aircraft is free of ice. By sensing the actual flow rate of heat and comparing this actual heat flow rate to the theoretical or calculated heat flow rate, a determination can be made as to whether or not ice is present on the surface of the wing. The flow of heat may be in either direction through the wing.

In the embodiment of the invention illustrated in FIG. 4, the rates of heat flow through upper and lower surfaces 12a and 20a of a wing 14a of an aircraft are sensed by heat flow sensors 16a and 102. The two heat flow rates are compared to determine if there is ice present on the wing 14a. In the embodiment of FIG. 5, the member 14b is formed separately from the structure upon which the presence of ice is to be detected.

Having described the invention, the following is claimed:

1. An apparatus for detecting the presence of ice on a surface of a member, said apparatus comprising means for sensing the rate of heat flow through a portion of the member, means for determining the actual temperature adjacent opposite sides of the member, means for calculating the rate of heat flow through the portion of the member as a function of the temperatures adjacent opposite sides of the member and based on the assumption that the surface of the member is free of ice, and means for comparing the calculated rate of heat flow to the sensed rate of heat flow to determine if ice is present on the surface of the member.

2. An apparatus as set forth in claim 1 further including means for securing said means for sensing the rate of heat flow through the member to the surface of the member.

3. An apparatus as set forth in claim 1 wherein said means for determining the temperature adjacent to opposite sides of the member includes a temperature sensor and a body of heat insulating material disposed between said temperature sensor and the surface of the member.

4. An apparatus as set forth in claim 1 wherein said means for determining the temperature adjacent to opposite sides of the member includes first temperature sensor means for sensing the temperature adjacent to a first side of the member and second temperature sensor means for sensing the temperature adjacent to a second side of the member opposite from the first side of the member.

5. An apparatus as set forth in claim 1 wherein the member includes a first side upon which includes the surface upon which the presence of ice is to be detected and a second side opposite from the first side, said means for determining the temperature adjacent to opposite sides of the member includes first sensor means for sensing the temperature adjacent to the first side of the member and second sensor means for determining the temperature adjacent to the second side of the member, said means for sensing the rate of heat flow through the member being disposed between the first and second sides of the member.

6. An apparatus as set forth in claim 1 further including means for securing the member to a surface upon which ice may form contemporaneously with the formation of ice on the surface of the member.

7. An apparatus for detecting the presence of ice on the surface of an aircraft wing which contains a fuel tank, said apparatus comprising heat flow sensor means for sensing the rate of flow of heat being conducted between a portion of the fuel tank and a portion of the surface of the aircraft wing, first temperature sensor means for sensing the temperature of a portion of the fuel in the fuel tank, second temperature sensor means for sensing the temperature adjacent to the surface of the aircraft wing, means for calculating a theoretical heat flow rate between the fuel tank and the surface of the aircraft wing as a function of the temperatures sensed by said first and second temperature sensor means, and means for comparing the calculated theoretical heat flow rate between the fuel tank and the surface of the aircraft wing to the sensed rate of flow of heat to determine if ice is present on the surface of the aircraft wing.

8. An apparatus for detecting the presence of ice on a wing of an aircraft, said apparatus comprising first heat flow sensor means mounted on an upper side surface of the aircraft wing for sensing the rate of heat flow through a portion of the upper surface of the aircraft wing, second heat flow sensor means mounted on a lower surface of the aircraft wing for sensing the rate of heat flow through a portion of the lower surface of the aircraft wing, and means for comparing the rates of flow of heat through the upper and lower surfaces of the aircraft wing to determine if ice is present on the aircraft wing.

9. A method of detecting the presence of ice on a surface of an aircraft wing, said method comprising the steps of sensing the rate of heat flow through a portion of the surface of the aircraft wing, determining the temperature within a portion of the aircraft wing, determining the temperature of the air outside the aircraft wing, calculating a rate of heat flow through the portion of the surface of the aircraft wing as a function of the temperature inside the aircraft wing and as a function of the temperature of the air outside the aircraft wing and based on the assumption that the surface of the aircraft wing is free of ice, and comparing the calculated rate of heat flow to the sensed rate of heat flow to determine if ice is present on the surface of the aircraft wing.

10. A method of detecting the presence of ice on the wing of an aircraft, said method comprising the steps of sensing the rate of heat flow through a portion of an upper surface of the aircraft wing, sensing the rate of heat flow through a portion of a lower surface of the aircraft wing, and comparing the rates of flow of heat through the portions of upper and lower surfaces of the aircraft wing to determine if ice is present on the aircraft wing.

11. A method for detecting the presence of ice on a surface of an aircraft wing, said method comprising the steps of determining the temperature adjacent to a first side of a member, said first side of the member being protected from exposure to the air around the aircraft wing, determining the temperature adjacent to a second side of the member, said second side of the member being exposed to the air around the aircraft wing, sensing the rate of heat flow between portions of the first and second sides of the member, calculating a rate of heat flow through the portion of the second side of the member as a function of the temperatures adjacent to the first and second sides of the member and based on the assumption that the second side of the member is free of ice, and comparing the calculated rate of heat flow to the sensed rate of heat flow to determine if ice is present on the second side of the member and the surface of the aircraft wing.

12. A method as set forth in claim 11 wherein the member forms part of the aircraft wing.

13. A method as set forth in claim 11 wherein the member is formed separately from and is secured to the aircraft wing.

\* \* \* \* \*